(12) United States Patent
Zhang et al.

(10) Patent No.: US 10,751,641 B2
(45) Date of Patent: Aug. 25, 2020

(54) PORTABLE SUPERCRITICAL FLUID EXTRACTION APPARATUS

(71) Applicant: CO2 Innovation Ltd., Coquitlam (CA)

(72) Inventors: Xiaohui Zhang, Coquitlam (CA); Ernst C. Janzen, North Vancouver (CA); Jiabin Liu, St. John's (CA)

(73) Assignee: CO2 Innovation Ltd., Coquitlam, British Coumbia (CA)

( * ) Notice: Subject to any disclaimer, the term of this patent is extended or adjusted under 35 U.S.C. 154(b) by 0 days.

(21) Appl. No.: 16/405,650

(22) Filed: May 7, 2019

(65) Prior Publication Data

US 2019/0262743 A1    Aug. 29, 2019

Related U.S. Application Data

(63) Continuation-in-part of application No. 15/697,601, filed on Sep. 7, 2017.

(51) Int. Cl.
B01D 11/02    (2006.01)

(52) U.S. Cl.
CPC ...... B01D 11/0203 (2013.01); B01D 11/0215 (2013.01); B01D 11/0288 (2013.01)

(58) Field of Classification Search
CPC .................................................. B01D 11/0203
See application file for complete search history.

(56) References Cited

U.S. PATENT DOCUMENTS

| 4,554,170 A | * | 11/1985 | Panzner | ................ | B01D 11/02 426/651 |
| 5,237,824 A | * | 8/1993 | Pawliszyn | .......... | B01D 11/0203 62/47.1 |
| 6,079,823 A | * | 6/2000 | Droege | ................ | B41J 2/17523 347/85 |

* cited by examiner

Primary Examiner — Donald R Spamer
(74) Attorney, Agent, or Firm — Gowling WLG (Canada) LLP

(57) ABSTRACT

A portable supercritical fluid extraction apparatus, comprising:
 (i) a pressure vessel for generating a supercritical fluid therein;
 (ii) a liquid solvent supply tank;
 (iii) a means for interconnecting said pressure vessel and said liquid solvent supply tank at a predetermined angle for delivery therethrough of a liquid solvent from the liquid storage tank to the pressure vessel; and
 (iv) a heating component for heating contents of the pressure vessel to produce a supercritical fluid therein.
The apparatus may additionally comprise a sample in fluid communication with the pressure vessel, and a receiving vessel in fluid communication with the pressure vessel. The pressure vessel may have a heating means for heating fluid contents therein, for example a heating wrap, a heating block, or a heating jacket.

5 Claims, 10 Drawing Sheets

PORTABLE SUPERCRITICAL FLUID EXTRACTION APPARATUS

TECHNICAL FIELD

This disclosure relates to extraction of organic compounds from solid materials using supercritical fluids. More specifically, this disclosure pertains to apparatus for creation and use of supercritical fluids as liquid solvents for extraction of organic compounds from solid materials.

BACKGROUND

Industrial-scale supercritical fluid extraction (SFE) facilities have been widely used for example, for decaffeination of coffee beans or teas, for removal of undesired substances from cork, for extraction of essential oils from herbaceous plant materials, for concentration of cannabinoids from cannabis, among other commercial uses. Bench-scale supercritical fluid extraction devices are also commercially available. However, laboratory-scale versions of SFE apparatus are too bulky and too heavy to be carried by an individual. The problems associated with the size and scale of even the smallest commercial SFE apparatus are due to the requirement for a pump component or a compressor plus cooling equipment.

There have been attempts to reduce the size of the components required for successful SFE processing. For example, U.S. Pat. Nos. 5,637,209 and 5,237,824 disclosed generation of supercritical carbon dioxide fluid in a generator tank by heating the carbon dioxide to certain temperature in the generator tank, then directing the supercritical carbon dioxide fluid into one or multiple extraction vessels for use in extraction processes. These designs replaced the pump or compressor with a supercritical fluid generator and thus reduced the weight and size of the supercritical fluid extractor to a portable level. However, the problems of bulkiness, excessive weight and size still remain with these smaller scale SFE apparatus.

SUMMARY

The embodiments of the present disclosure generally relate to a portable supercritical carbon dioxide extraction apparatus that may be carried by one individual and that has mechanically passive components.

BRIEF DESCRIPTION OF THE FIGURES

The present disclosure will be described in conjunction with reference to the following drawings in which.

DETAILED DESCRIPTION

The embodiments of the present disclosure relate to a portable apparatus for creation and use of supercritical fluids as liquid solvents for extraction of organic compounds from solid materials. The portable supercritical carbon dioxide extraction apparatus may be easily handled and carried by one individual and has mechanically passive components.

Figure 1:
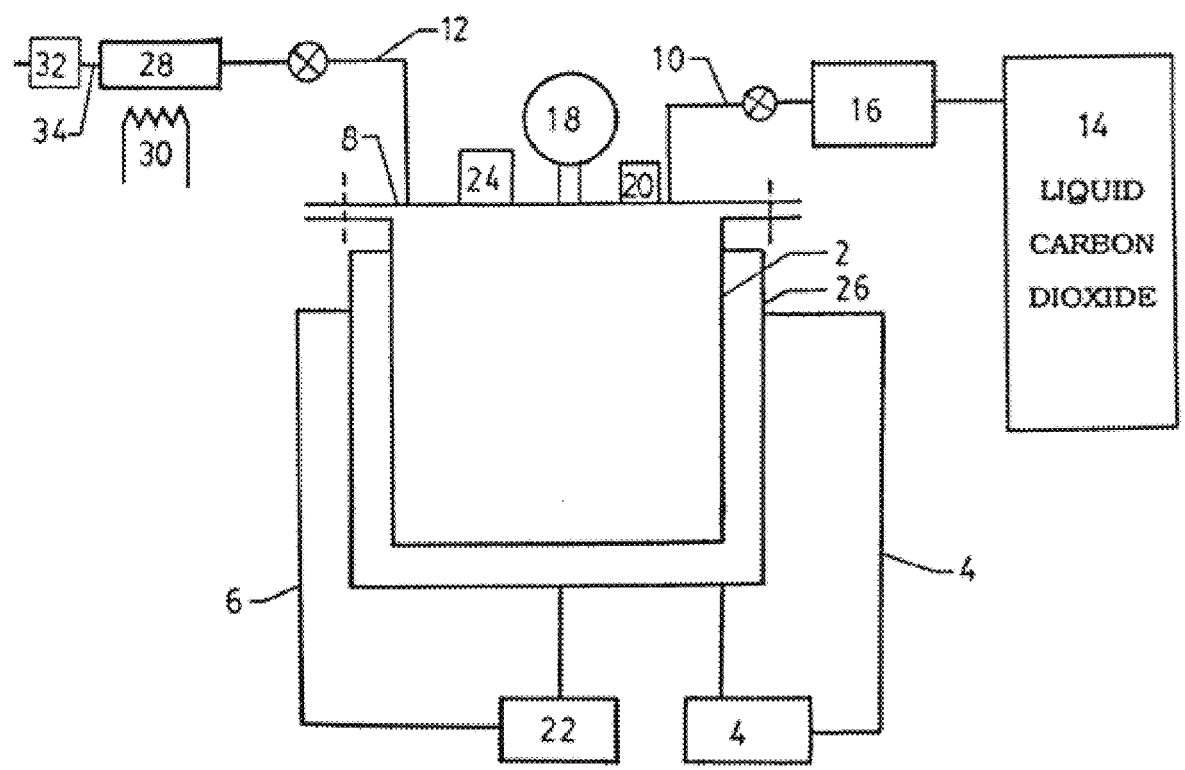
FIG. 1 is a schematic illustration of a prior art supercritical fluid extraction (SFE) apparatus disclosed in U.S. Pat. No. 5,237,824.
Figure 2:
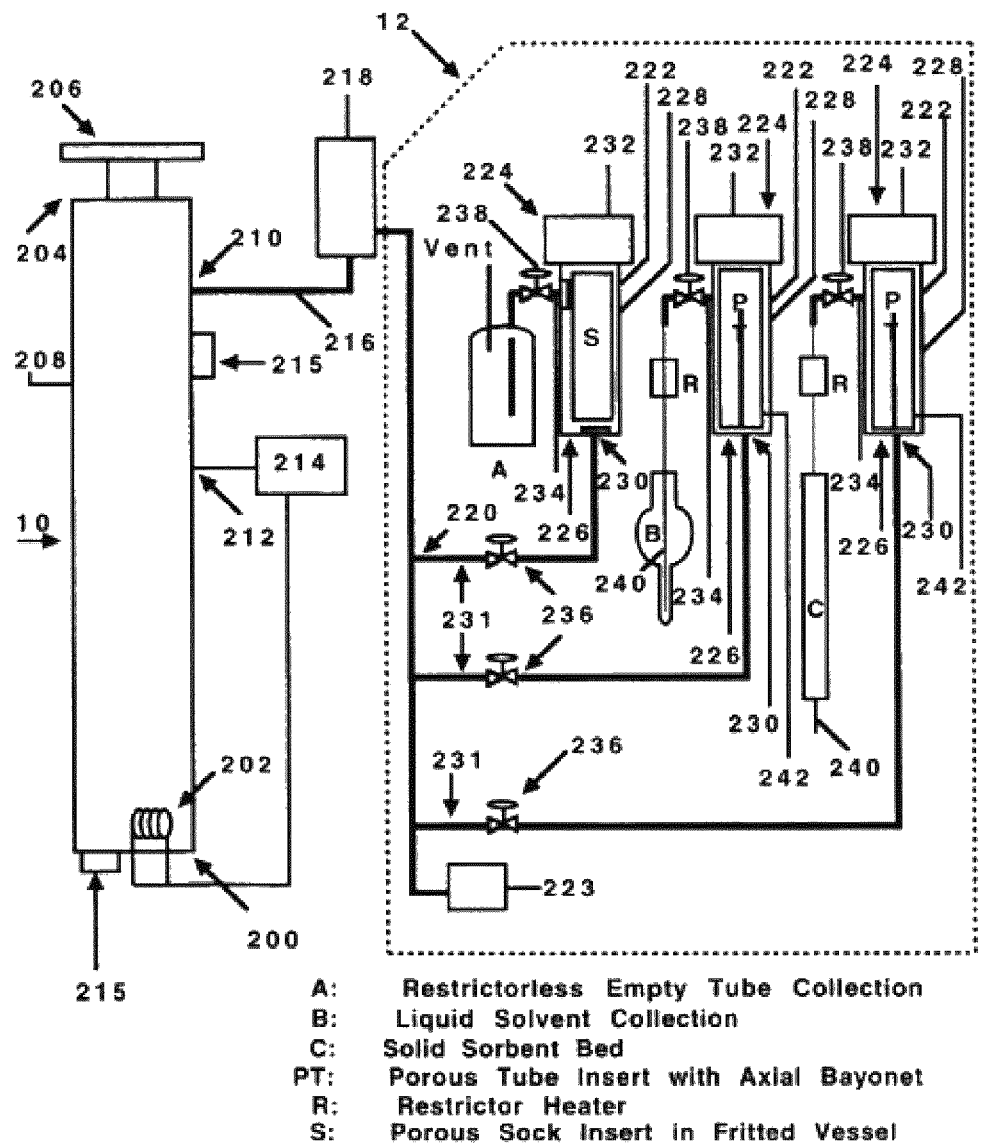
FIG. 2 is a schematic illustration of a prior art supercritical fluid extraction (SFE) apparatus disclosed in U.S. Pat. No. 5,637,209.
Figure 3:
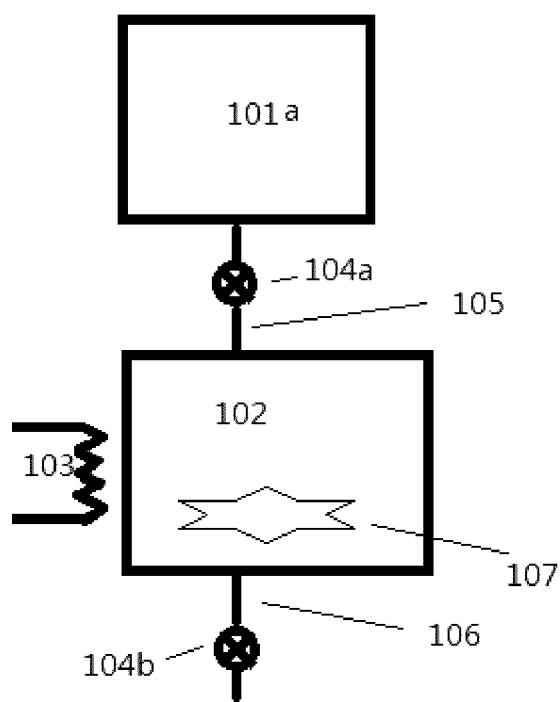
FIG. 3 is a schematic illustration of one embodiment of an apparatus disclosed herein having one extraction vessel, two on/off valves, one heating element, and one reversely placed liquid solvent supplying tank.

A schematic illustration of a supercritical carbon dioxide extraction apparatus according to one embodiment of the present disclosure, is shown in FIG. 3. The apparatus has a solvent tank 101a having a downward-pointing outlet extending from the bottom of the solvent thank 101a, through which liquid solvent is controllably delivered into the extraction vessel 102 through valve 104a. The apparatus is prepared for use by placing valves 104a and 104b into a closed position. The extraction vessel 102 is opened and the solid samples 107 to be extracted are placed into the extraction vessel 102. Then, the extraction vessel 102 is closed and sealed after which, valve 104a is opened thereby letting liquid solvent pass from the solvent tank 101a through inlet 105 and into the extraction vessel 102. Then, valve 104a is closed and extraction vessel 102 is heated with heating element 103 until the liquid solvent in extraction vessel 102 reaches a supercritical phase after which, the extraction of soluble materials from the solid samples 102 begins. When the extraction process is completed, valve 104b is opened to release carbon dioxide and an extract solution from the extraction vessel 102 via outlet 106. Finally, the extraction vessel 102 is opened fore removal of the extracted sample residues, and for cleaning.

Figure 4:
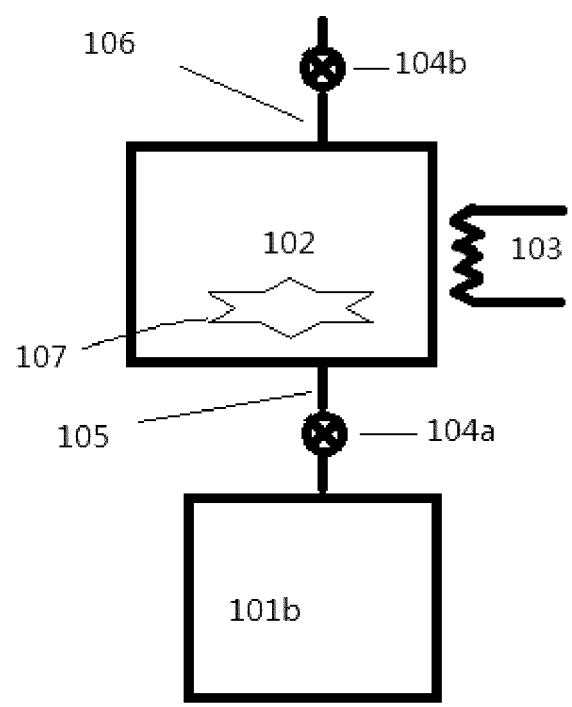
FIG. 4 is a schematic illustration of another embodiment of an apparatus disclosed herein having one extraction vessel, two on/off valves, one heating element, and one normally placed liquid solvent supplying tank with dip tube.

A schematic illustration of another embodiment of a supercritical carbon dioxide extraction apparatus according to this disclosure, is shown in FIG. 4. The apparatus comprises a dip-tubed solvent tank 101b with an upward-extending outlet. This apparatus is prepared for use by closing valves 104a and 104b. The extraction vessel 102 is opened and the solid samples 107 to be extracted are placed into the extraction vessel 102. Then, the extraction vessel 102 is closed and sealed after which, valve 104a is opened thereby letting liquid solvent pass from the solvent tank 101a through inlet 105 and into the extraction vessel 102. Then, valve 104a is closed and extraction vessel 102 is heated with heating element 103 until the liquid solvent in extraction vessel 102 reaches a supercritical phase after which, the extraction of soluble materials from the solid samples 102 begins. When the extraction process is completed, valve 104b is opened to release carbon dioxide and an extract solution from the extraction vessel 102 via outlet 106. Finally, the extraction vessel 102 is opened fore removal of the extracted sample residues, and for cleaning.

Figure 5:
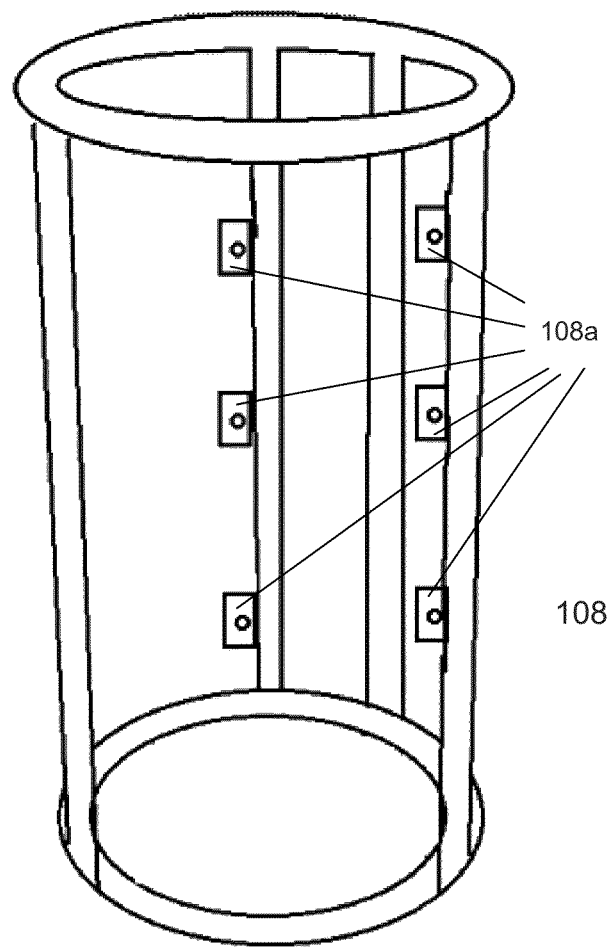
FIG. 5 is an isometric illustration of an embodiment of a holder for liquid solvent tanks heavier than 300 g according to one aspect of the present disclosure.

FIG. 5 is an isometric drawing of a tank holder 108 for demountably engaging a carbon dioxide tank therein. The tank holder 108 may made of metal. A carbon dioxide tank (not shown) can be secured to the tank holder 108 with a suitable means such as, for example, chains or metal bands or resistant polymeric bands 109 passing through plates 108a having apertures provided therefore. It is to be noted that a carbon dioxide tank may be secured to the tank holder 108 with the tank's valve outlet in an upward-pointing position or alternatively, with the tank's valve outlet in a downward-pointing position.

Figure 6:
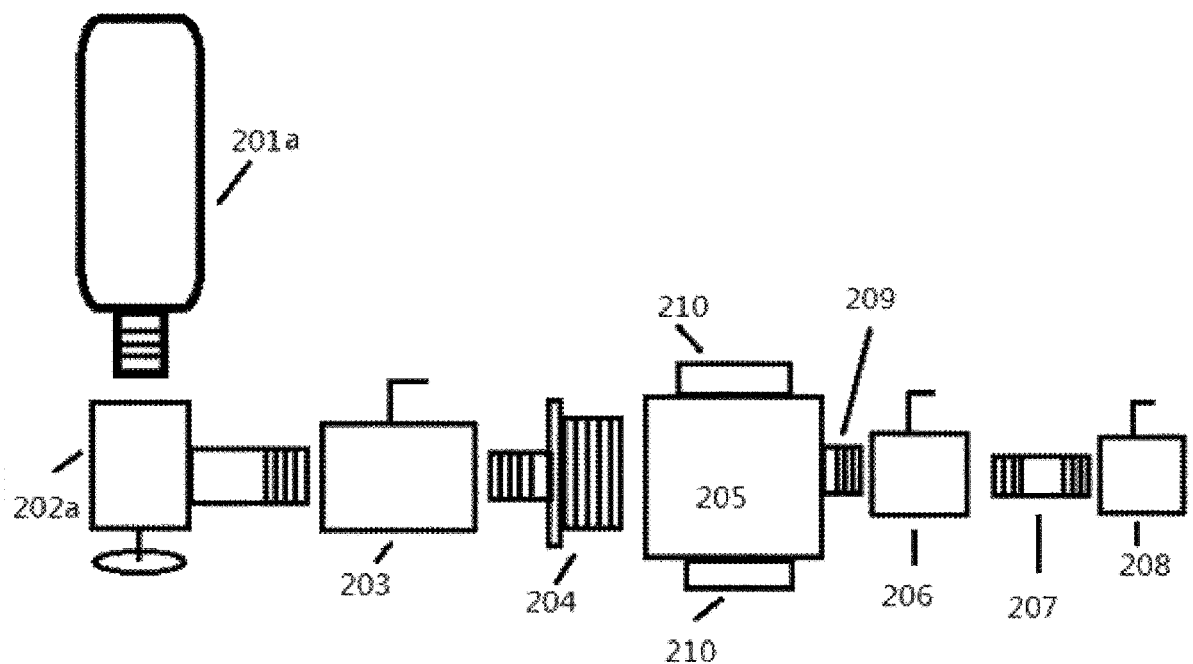
FIG. 6 is an isometric drawing of an extraction vessel connected with a threaded cartridge and a receiving tank according to another aspect of the present disclosure.

FIG. 6 is an exploded schematic illustration of another embodiment of the apparatus disclosed herein, having an extraction vessel 205 that is interconnected with a threaded solvent cartridge 201a. A suitably sized threaded solvent cartridge 201a is demountably engaged with an adaptor 202a that in turn, is demountably engaged with a first valve 203 that in turn, is demountably engaged with an inlet & cap 204 that is demountably engaged with a solvent inlet provided therefore in the extraction vessel 205. The extraction vessel 205 is provided with a heating element 210 that is contact with the outer cylindrical surface of the extraction element 205 and extends around its outer cylindrical surface. The extraction vessel 205 has an outlet 209 that is demountably engaged with a second valve 206 that in turn, is demountably engaged with a receiving tank 207 that in turn, is demountably engaged with a third valve 208. A suitable size for the solvent cartridge may be 12 g, 16 g, 20 g, 25 g, 90 g 100 g and therebetween or larger. The solvent cartridges may contain therein a pressurized solvent such as, for example, carbon dioxide, nitrous oxide, and the like deliverable in their liquid state. After the extraction vessel filled with a sample to be extracted, the second valve 206 and the third valve 208 are turned to closed positions, the first valve 203 is turned to an open position thereby allowing a flow of the liquid solvent from the solvent cartridge 201a through valve 203 and inlet & cap 204 into extraction vessel 205. Solvent flow is continued through the first valve 203 until the solvent saturates the extraction vessel 205. Then, the first valve 203 is closed thereby making the extraction vessel 205 a closed system. Turning on heating element 210 increases the temperature of the liquid solvent within the extraction vessel 205 until it reaches its supercritical phase. The supercritical fluid solvent and the liquid fluid solvent in the extraction vessel 205 are balanced by repeatedly opening and closing valve 206, after which, the second valve 206 is closed and extraction begins. When the extraction has been completed, for example, after an extraction period of 5 min, 10 min, 15 min, 20 min, 30 min, and therebetween, heating element 210 is turned off and the second valve 206 is opened for a selected period of time, for example, 1 min, 2 min, 3 min, 4 min, 5 min, 10 min, and therebetween, to permit the supercritical phase and the liquid phase of the solvent to permeate through outlet 209 into the receiving tank 207, after which the second valve 206 is closed. Then, third valve 208 is quickly opened and closed several times to vent the supercritical phase of the solvent solution from the receiving tank 207. Then, the third valve 208 is closed and the second valve is opened a second time for a selected period of time, for example, 1 min, 2 min, 3 min, 4 min, 5 min, 10 min, and therebetween, to permit the additional supercritical phase and the liquid phase of the solvent to permeate through outlet 209 into the receiving tank 207, after which the second valve 206 is closed. Then, third valve 208 is again quickly opened and closed several times to vent the supercritical phase of the solvent solution from the receiving tank 207. It is optional if so desired, to close the third valve 208 again and open the second valve for a third time for a selected period of time, for example, 1 min, 2 min, 3 min, 4 min, 5 min, 10 min, and therebetween, to permit the remaining supercritical phase and the liquid phase of the solvent to permeate from the extraction tank through outlet 209 into the receiving tank 207, after which the second valve 206 is closed. Then, third valve 208 is again quickly opened and closed several times to vent the supercritical phase of the solvent solution from the receiving tank 207. Finally, the reaction vessel is demounted from the apparatus and the liquid phase of the solvent containing therein solubilized compounds extracted from the sample that was loaded into the extraction tank 205.

Figure 7:
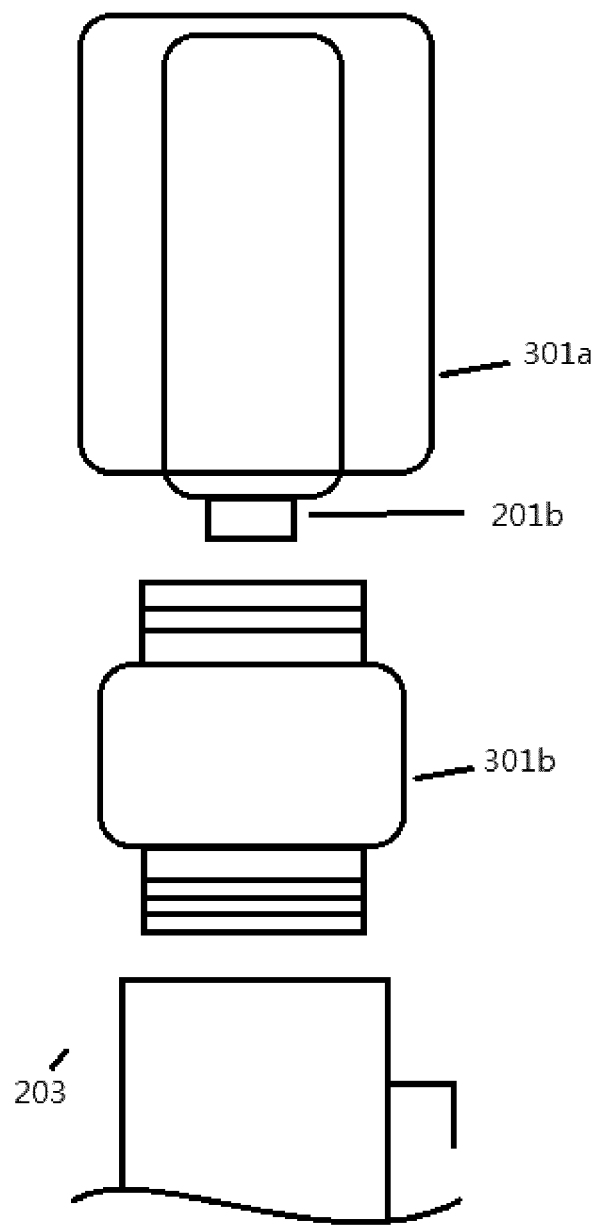
FIG. 7 is an isometric drawing of a non-threaded carbon dioxide cartridge with a holder and an adaptor to connect with an on/off valve according to another aspect of the present disclosure.

FIG. 7 is an isometric illustration showing an un-threaded solvent cartridge 301a having a cylindrical outlet 201b that is frictionally demountably engageable with female receptacle on an inlet side of an adaptor 301b with threaded male end on the outlet side of the adaptor 301b. The threaded male end on the outlet side of the adaptor 301b is threadably demountably engageable with the first valve 203 of the apparatus illustrated in FIG. 6.

Figure 8:
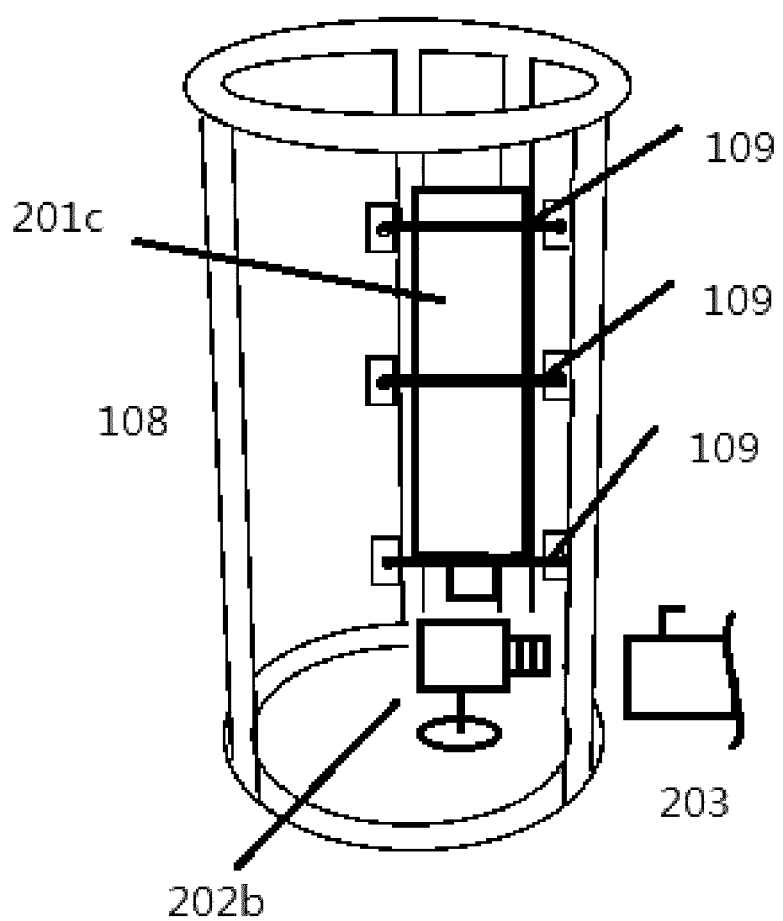
FIG. 8 is an isometric drawing of a SODASTREAM® (SODASTREAM is a registered trademark of Soda-Club (CO2) Atlantic GMBH gesellschaft mit beschränkter haftung (gmbh), Bösch 67 Hünenberg, Switzerland) carbon dioxide tank or a paintball carbon dioxide tank with a holder and an adaptor to connect with an on/off valve according to another aspect of the present disclosure.

FIG. 8 is an isometric illustration of a SODASTREAM®-like solvent tank 201c (or alternatively, a paintball carbon dioxide tank) demountably engaged with a tank holder 108 and adaptor 202b which is sealably interconnected with the first valve 203. The carbon dioxide tank 201c is demountably engaged with the tank holder 108 by a suitable means such as, for example, chains or metal bands or resistant polymeric bands 109 to the holder 108.

Figure 9:
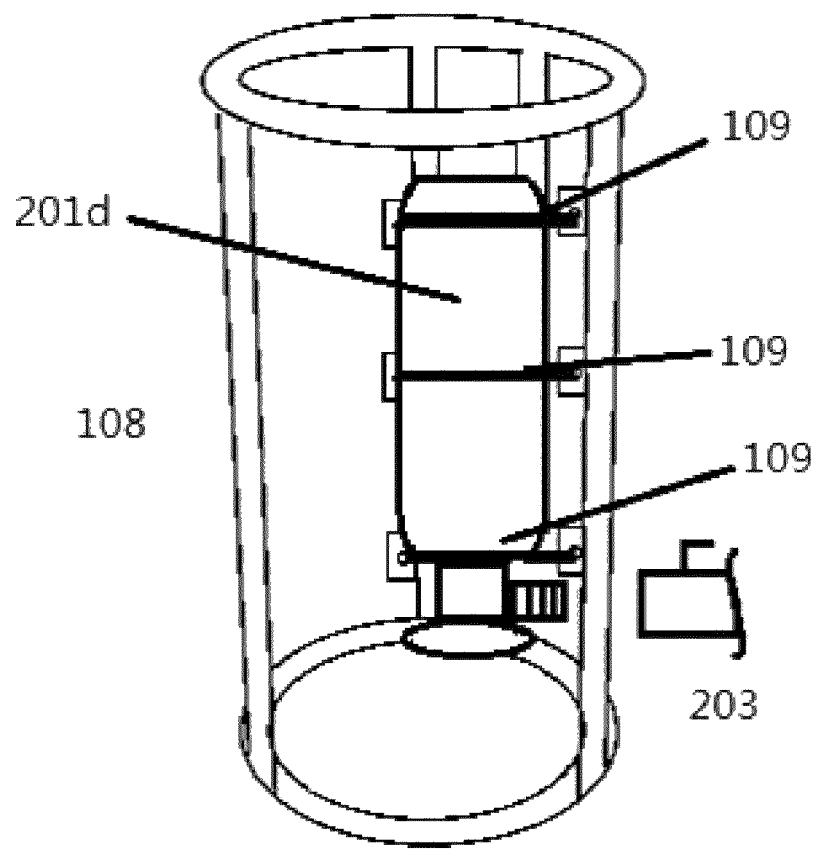
FIG. 9 is an isometric drawing of a carbon dioxide tank with a holder for connection with an on/off valve according to another aspect of the present disclosure.

FIG. 9 is an isometric drawing of a suitable carbon dioxide tank 201d that may be sourced from retail beer and/or wine stores, welding stores, or commercial suppliers of carbon dioxide tanks (such as Airgas and Praxair), with a holder 108 and to connect with the first valve 203. The carbon dioxide tank 201d is demountably engaged with the tank holder 108 by a suitable means such as, for example, chains or metal bands or resistant polymeric bands 109 to the holder 108.

Figure 10:
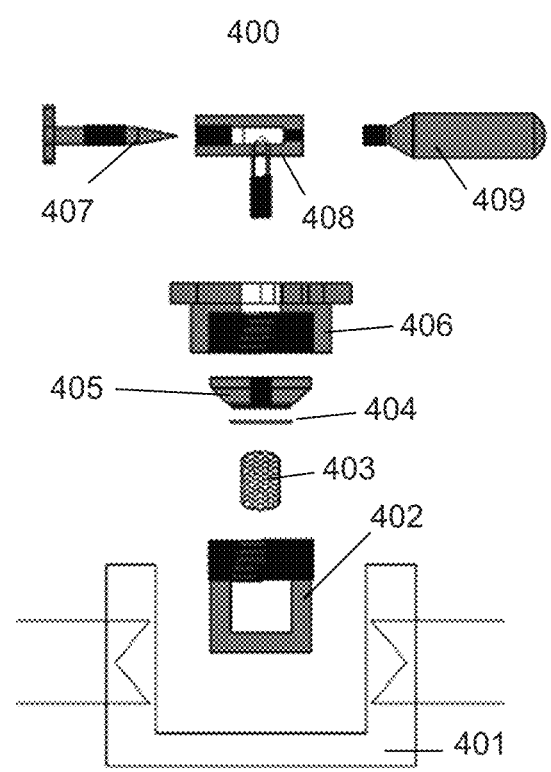
FIG. 10 is a schematic illustration of another embodiment of an apparatus disclosed herein.

FIG. 10 is a schematic illustration of another apparatus 400 of the embodiments disclosed herein. The apparatus 400 comprises an extraction vessel 402 that is demountably engageable with a heating element 401. The extraction vessel is configured for receiving therein a sample infuser 403 that can be sealing engaged therein with a cap 406 provided with a sealing gasket 405 and an O-ring 404. The cap is configured for sealable demountable engagement with a valve seat 408. A threaded solvent cartridge 409 may be sealably demountably engaged with a threaded receptacle provided therefore in the valve seat 408. A piercing valve 407 having a handle at one end and a piercing needle at the other end is configured for sealably threaded demountable engagement with an end of the valve seat that is opposite to the threaded receptacle configured for receiving therein a threaded solvent cartridge. Operation and use of apparatus 400 begins with its unassembled components. A sample to be extracted is placed into the sample infuser 403 that is then inserted into the extraction vessel 402. The sample infuser 403 is sealed into the extraction chamber 402 by demountable engagement with the extraction chamber 402, of the O-ring 404, the sealing gasket 405, and the cap 406. The valve seat 408 is sealably demountable engaged with the cap 406 after which, a threaded solvent cartridge 409 is sealably demountably engaged with the threaded receptacle provided therefor in the valve seat 408. Then, the piercing valve 407 is sealably threadably engaged with the valve seat 406 whereby the piercing needle of the piercing valve 407 pierces the end of the threaded solvent cartridge 409 after which, the piercing needle is disengaged from the pierced end of the threaded solvent cartridge 409 thereby releasing the pressurized solvent contents from the solvent cartridge 409 through the valve seat 408 and the cap 406 into the extraction vessel 402. Then, the heating element 401 is turned on to a selected temperature and the apparatus is maintained in its closed condition until the solvent permeating the extraction vessel 402 reaches a supercritical phase. The apparatus is then further maintained with the solvent in its supercritical phase for a selected period of time, for example 10 min, 15 min, 20 min, 30 min, 40 min, 50 min, 60 min, and therebetween, during which time compounds comprising the sample will be solubilized by the solvent in its supercritical phase and will be retained in the liquid phase of the solvent. After the selected extraction period has been completed, one of the following two options may be performed. The first option is to turn off the heating element 401 and then vent the supercritical phase of the solvent from the extraction vessel 402 by quickly disengaging and re-engaging (i.e., quickly opening and closing) the piercing valve 407 with the valve seat 408. After the supercritical phase of the solvent has been vented from the extraction vessel 402, the extraction vessel 402 is opened by demounting the cap 406 with its sealing gasket 405 and O-ring 404, and the sample infuser 403 is removed from the extraction vessel 402. Finally, the liquid phase of the solvent is collected from the extraction vessel 402. The second option after the extraction period has been completed, is to turn off the heating element 401 and then remove the cap 406 and rinse the extracted sample in the sample infuser 403 with ethanol thereby removing any solubilized compounds remaining in the extracted sample, then collecting from the extraction vessel 402 the liquid phase that now additionally comprises the rinsing solution from the washed extracted sample.

Suitable solvents that may be used with the portable supercritical fluid extraction apparatus disclosed herein include, for example, carbon dioxide, nitrous oxide, propane, butane, methane, ethane, n-pentane, n-hexane, n-heptane, acetonitrile, acetone, methanol, ethanol, isopropanol, carbon disulfide, ammonia, xenon, water, fluoroform, sulfur hexafluoride, monofluoromethane, dichloromethane, chloroform, chlorotrifluoromethane, chlorodifluoromethane, difluoromethane, benzene, cyclohexane, isobutene, hydrogen sulfide, and 2,2-dimethyl propane.

The liquid solvent supply tank for containing and supplying the solvents to the pressure vessel may be a nonthreaded cartridge or a threaded cartridge. The non-threaded cartridge or a threaded cartridge may be a 7.5-gram cartridge, a 10-gram cartridge, a 12-gram cartridge, a 15-gram cartridge, a 20-gram cartridge, a 25-gram cartridge, a 50-gram cartridge, a 75-gram cartridge, a 100-gram cartridge, and therebetween. Alternatively, the liquid solvent supply tank may be a 2.5-lb tank, a 5-lb tank, a 10-lb tank, a 15-lb tank, a 20-lb tank, a 25-lb tank, a 25-lb tank, a 50-lb tank, a 75-lb tank, a 100-lb tank, a 150-lb tank, a 200-lb tank, a 220-lb tank, and therebetween.

According to some aspects, the apparatus disclosed herein comprises means for joining said pressure vessel and said liquid solvent supplying tank or cartridge with various sized adaptors to sealably connect said solvent-supplying tanks or cartridges to said pressure vessel.

According to some aspects, the apparatus disclosed herein have predetermined angles for inverting and sitting the solvent supplying tank or cartridge sealably connecting with the pressure vessel, and wherein the dip-tubed solvent supplying tank or cartridge is situated in an upright position to supply the solvent to the pressure vessel.

According to some aspects, the apparatus disclosed herein has a heating means for the pressure vessel selected from the group of heating wraps, heating blocks, and heating jackets.

According to one embodiment of the present disclosure, the portable supercritical fluid extraction apparatus is provided with a sample infuser in fluid communication with the pressure vessel. The sample infuser is configured for receiving therein a sample and infusing the sample with a supercritical fluid. The sample infuser may have a shape selected from the group of a cylindrical tube, tube having a hairpin shape, a portafilter shape, conical shape, a spherical shape, and a ball shape.

According to another embodiment of the present disclosure, the portable supercritical fluid extraction apparatus is additionally provided with a receiving tank in communication with the pressure vessel for receiving therein an extract produced by infusing the sample with the supercritical fluid. According to one aspect, the receiving tank may comprise a vent for venting the solvent. According to another aspect, the receiving tank may have an access port for removing the extract therethrough. According to an embodiment of the present disclosure, the receiving tank may function to receive from the pressure vessel and optionally store therein the tank, an extract. Additionally, the receiving tank may receive the supercritical fluid from the pressure vessel, and condense the supercritical fluid into an ambient liquid form.

EXAMPLES

Example 1

With 10 ml extraction vessel, when it's filled at 20° C., 17 g liquid carbon dioxide can be filled. And heat the extraction vessel to 50° C., the pressure of the extraction vessel would reach 1600 psi. The pressure and temperature exceeds the critical point of the carbon dioxide. The density of supercritical carbon dioxide in the vessel is 1.7 $g/cm^3$ or 1700 $Kg/m^3$.

Example 2

When the 10 ml extraction vessel is filled at 8° C., 46 g liquid carbon dioxide can be filled. And heat the extraction vessel to 50° C., the pressure of the extraction vessel would reach 4000 psi. And heat the extraction vessel to 70° C., the pressure of the extraction vessel would reach 5400 psi. The above parameters of pressure and temperature all exceed the critical point of the carbon dioxide. The density of supercritical carbon dioxide in the vessel is 4.6 $g/cm^3$ or 4600 $Kg/m^3$.

Present apparatus simplified the apparatus by omitting the supercritical fluid generator tank, and only using an extraction vessel to complete both supercritical fluid generating and extracting work. Thus several advantages of one or more aspects are that the supercritical fluid extraction apparatus can be lighter and smaller. Other advantages of one or more aspects are that the supercritical fluid extraction apparatus can be used to fit various solvent sources, ranging from gram level carbon dioxide cartridges, hundreds grams level SODASTREAM® carbon dioxide tank, paintball carbon dioxide tanks, carbon dioxide tanks from welding shops, brewing stores, and other carbon dioxide suppliers; nitrous oxide cartridges or tanks; propane cartridges or tanks; butane cartridges or tanks; ammonia cartridges or tanks; and so on. Other advantages of one or more aspects are that with the light weight and small size, the present apparatus can be used for on-site extraction work for lab usage or commercial usage, such as decaffeinate coffee in coffee store, extracting tetrahydrocannabinol from cannabis or nicotine from tobacco.

The present apparatus can be coupled with a coffee machine to make decaffeinated coffee. The present apparatus may alternatively coupled with vaporizers or inhalers for cannabis or tobacco usage.

The invention claimed is:

1. A portable supercritical fluid extraction apparatus, comprising:
   (i) an extraction vessel for generating a supercritical fluid therein;
   (ii) a heating element for demountably engaging the extraction vessel therein;
   (iii) a sample infuser for mounting therein the extraction vessel;
   (iv) a cap for demountable and sealing engagement with the extraction vessel, said cap provided with a gasket and an O-ring therein; and
   (v) a piercing valve assembly configured for sealably demountable engagement with the cap, said piercing valve assembly having a threaded receptacle for threadably engaging therein a threaded solvent cartridge.

2. The apparatus of claim 1, wherein the sample infuser has a shape selected from one of a cylindrical tube, tube having a hairpin shape, a portafilter shape, conical shape, a spherical shape, and a ball shape.

3. The apparatus of claim 1, wherein the threaded solvent cartridge contains a liquid solvent that is one of carbon dioxide, nitrous oxide, propane, butane, methane, ethane, n-pentane, n-hexane, n-heptane, acetonitrile, acetone, methanol, ethanol, isopropanol, carbon disulfide, ammonia, xenon, water, fluoroform, sulfur hexafluoride, monofluoromethane, dichloromethane, chloroform, chlorotrifluoromethane, chlorodifluoromethane, difluoromethane, benzene, cyclohexane, isobutene, hydrogen sulfide, and 2,2-dimethyl propane.

4. The apparatus of claim 1, wherein the threaded solvent cartridge is a threaded carbon dioxide cartridge.

5. The apparatus of claim 4, wherein the threaded carbon dioxide cartridge is one of a 7.5-gram cartridge, a 10-gram cartridge, a 12-gram cartridge, a 15-gram cartridge, a 20-gram cartridge, a 25-gram cartridge, a 50-gram cartridge, a 75-gram cartridge, a 100-gram cartridge, and therebetween.

* * * * *